United States Patent [19]

Braun et al.

[11] Patent Number: 4,962,631
[45] Date of Patent: Oct. 16, 1990

[54] EDGER

[75] Inventors: Stephen A. Braun, Horicon; Michael J. O'Neill, Mayville; Roger W. Curry, Horicon, all of Wis.; James R. Titze, Bloomington; Donald E. Niosi, Prior Lake, both of Minn.; Tetsuzo Fujikawa, Kobe, Japan; Makizo Hirata, Hyogo, Japan; Michio Nishimura, Kobe, Japan

[73] Assignee: Deere & Company, Moline, Ill.

[21] Appl. No.: 404,145

[22] Filed: Sep. 7, 1989

[51] Int. Cl.$^5$ .................... A01D 34/47; A01D 34/84
[52] U.S. Cl. ........................... 56/17.2; 56/11.3; 56/256; 172/15; 172/17
[58] Field of Search ............. 56/11.3, 12.7, 16.7, 56/17.1, 17.2, 233, 256; 172/13, 15, 17, 43, 356; 30/DIG. 5

[56] References Cited

U.S. PATENT DOCUMENTS

| | | | |
|---|---|---|---|
| 2,771,730 | 11/1956 | True | 56/256 X |
| 2,847,813 | 8/1958 | Hanson, Jr. et al. | 172/15 |
| 2,882,777 | 4/1959 | Smith et al. | 172/15 |
| 2,977,740 | 4/1961 | King | 56/256 X |
| 3,777,460 | 12/1973 | Mokros | 56/16.7 |
| 3,998,034 | 12/1976 | Rubin | 56/11.3 |
| 4,645,011 | 2/1987 | Feikema et al. | 172/15 |

OTHER PUBLICATIONS

Tanaka Tomorrow's Tools for Today's Jobs; Author-Tanaka; 12 pages; Date-1987; Place of publication-U.S.A.

McLane Operator's Manual for Edger/Trimmer; Author-McLane Manufacturing, Inc., Paramount, Calif; 13 pages; Date-1986; Place of publication-U.S.A.

Toro Gas Trimmers . Vacuums . Blowers . Edgers . . Generators; Author-The Toro Company; 4 pages; Date-1988; Place of publication-U.S.A.

*Primary Examiner*—George A. Suchfield

[57] ABSTRACT

The present invention provides an edger wherein a cutter device is arranged on one side of an edger frame, the position of a front wheel is adjustable, the position of one of the rear wheels situated on the other side of the edger frame is also adjustable, and a mechanism for changing the position of the front wheel as well as changing the position of the rear wheel is performed by a single control lever at the operator's station. With this arrangement, the adjustment of the depth of the cutter and the adjustment for maintaining the edger in a horizontal condition when the edger is driven on a curbstone can be easily effected by the operator.

21 Claims, 7 Drawing Sheets

EDGER

BACKGROUND OF THE INVENTION

1. Field of the Invention

The present invention relates to an edger for trimming an edge of a grassland such as a grassy lawn adjacent to a pavement, building or the like.

2. Description of the Prior Art

In general, an edger of this kind includes a powered cutter device arranged at one side of a traveling body or edger vehicle having wheels, and is controlled by an operator so that an edge of the grassland is trimmed by the edger as he manipulates rearwardly positioned operating handles or controls.

In one conventional edger cutter device driven by a belt, the mechanism for clutching the cutter drive belt also serves to adjust the cutter depth. Accordingly, once the belt has been engaged, the depths of the blade cannot be adjusted.

A conventional edger includes a powered cutting device or blade arranged at the side of the traveling frame or edger vehicle having wheels. It is controlled by an operator so that the edge of the grassland or lawn is trimmed by the cutter blade of the edger as the operator moves the edger frame along the sidewalk or similar hard surface adjacent the lawn.

In the typical edger, it is desirable to have the depth of the cutter blade set to allow the blade to penetrate the ground and roots of the grass so that a clean cut results and the grass and its roots to be removed are easily lifted out of the ground.

One conventional edger includes a cutter blade depth adjusting mechanism which must be set prior to engagement of the blade drive clutch. Once the depth has been set with this edger, the clutch can be engaged but thereafter the depth of the blade can no longer be adjusted until the blade drive is disengaged. Since the operator can most easily determine whether the blade is penetrating the roots while the edger is cutting, it is desirable to be able to adjust the depth of the blade while the blade is engaged. It is desirable therefore to provide an edger wherein the depth of the blade can be adjusted separate from the control for drivingly engaging or disengaging the blade and while the blade is cutting.

Another commercial edger does provide for adjustment of the blade depth separate from engagement of the clutch and while the blade is operating. However, this blade is driven by a centrifugal clutch which couples the shaft carrying the cutter blade directly with the crankshaft of the engine. As this blade encounters obstacles, the shock loads transmitted from the blade to the engine crankshaft can potentially damage the engine.

It is therefore desirable to provide an edger having a blade driven by some means other than a centrifugal clutch so that shock loading encountered by the blade is not transferred to the engine.

One belt driven edger provides for operator adjustment of the blade depth while the blade is being driven. This edger, however, utilizes a detented control having to selectively position the lever in a desired blade depth setting. The depth setting is selected after the drive belt has been engaged. Since the depth setting is selected with the blade running, it continues to run unless the lever is returned to a 0 setting and the belt is disengaged. Accordingly, this machine can continue to operate when the operator leaves the handle or control of the edger, thereby posing a potential safety problem.

It would therefore be desirable to provide an edger wherein the depth of the cutter blade can be adjusted while the blade drive is engaged. Further, it would be desirable to provide a drive means for the blade in a form which does not provide for transfer of shock loads from the blade to the engine crankshaft. Additionally, it would be desirable to provide a control mechanism for maintaining engagement of the blade only when the operator is at the rear of the machine and is actively controlling the drive. More specifically, it would be desirable to provide a bale handle control arrangement for the operator to grasp with one or both hands such that when his grasp on the handle and the control is released, the drive for the cutter blade is disengaged.

SUMMARY

A main object of the present invention is to provide a belt driven edger wherein mechanism is provided for the operator, while standing behind the edger and operating the machine, to adjust the depth of the cutter blade separately from engagement of the clutch, and irrespectively of whether the blade is operating. Further, the control mechanism requires the presence of the operator for the blade drive to continue to be engaged.

Means to adjust the position of one of the rear wheels for stepped surfaces is also incorporated into the edger and can be effected through a control lever positioned at the operator station. That control lever also serves to enable the operator to set or adjust the cutter blade depth independently of whether the clutch is engaged. It further requires only a light or weak force of the operator's hand to activate.

Another object of the present invention is to provide an edger wherein the position of the curb wheel can easily and quickly be adjusted up or down, relative to the edger blade, and the mechanism and operation for changing the position of the wheels depth and curb is simplified.

In order to achieve the above objects, the present invention provides an edger wherein a front or blade depth wheel is supported on a front part of an edger frame in such a manner that the position of the front wheel can be adjusted; a cutter device is arranged at one side of the edger frame; one of the wheels which is situated on the other side of the edger frame is supported by the edger frame in such a manner that the position of the rear wheel can be adjusted to accommodate curbs or stepped surfaces; a position setting member for locking the front depth wheel at a desired position and a rear wheel position setting member for locking the adjustable rear wheel at a desired position are arranged adjacent to each other on the edger frame; a single cam lever is provided for changing either setting by engagement with these set members; a single control lever is rotatably arranged on handle portions positioned at a rear portion of the edger frame; and the control lever is operatively connected to the change lever through a relay rod.

In order to make the depth and curb wheel position changing mechanism compact, the front or depth wheel position setting means and the adjustable rear or curb wheel position setting means include two left and right coaxial set pins each having a guide pin, a return spring extending between the guide pins to bias the set pins towards respective wheel position setting conditions, and a cam lever than engages both guide pins.

In an alternative embodiment, the depth and curb wheel changing mechanism includes two cam levers rotatably mounted on a common shaft, a single return spring for biasing both of the cam levers toward respective wheel position locking conditions, and a single guide pin for engaging both cam levers.

In order to facilitate either depth or curb wheel adjusting operation, the control lever is so arranged that, when it is shifted from its neutral position toward one side, the front or depth wheel position setting member is released from a locked position, and, when the control lever is shifted from the neutral position toward the other side, the fixed condition obtained by the adjustable rear wheel position setting member is released from a locked position.

In order to easily adjust, lock or set the front wheel position in relation to the frame, a front or depth wheel supporting arm is mounted on a shaft carried on the edger frame for swinging movement in an up-and-down direction, a position set plate having a plurality of position set openings is formed on the front wheel supporting arm, a locking set member is provided for engagement with the openings, and a bias spring is connected to the arm support shaft for biasing the supporting arm downward.

Stops may be formed on the position set plate of the depth wheel supporting arm, which can be abutted against the edger frame to establish a maximum and minimum position of the front wheel.

In order to easily adjust the position of the rear wheel, it is supported by the rear end of a longitudinally extending rear wheel supporting arm. The front portion of the rear wheel supporting arm is rotatably mounted on an arm support shaft carried on the edger frame. The support arm also has a position set plate with a plurality of position set openings at its front end which are engageable with a rear wheel position setting member.

An inverted U-shaped reinforcement member may be attached to the rear wheel supporting arm and carried on the arm support shaft about which the adjustable rear wheel supporting arm pivots. The member can serve to reinforce the rear wheel support and limit the downward movement of the rear wheel as the member abuts the edger frame.

To limit the upward movement of the rear wheel and its supporting arm, an arm guide can be provided on the frame. This guide opens downwardly and receives the rear end of the rear wheel supporting arm. One or more ribs may be formed on the vertical inside surface of the arm guide to laterally stabilize the rear wheel support arm when it is positioned on the arm guide.

A dust cover of elastic or flexible material may be provided for covering the front wheel position setting member, the rear wheel position setting member, and the single cam lever. For ease of installation and removal, the dust cover may be provided with a locating recess or guide on its front wall and locking projections on spring-back side walls.

When the depth of the cutter is to be adjusted, the operator can move the hand control lever which rotates the cam to one side to disengage the front wheel position setting member from the associated set opening of the position set plate and then the front wheel can be moved to the desired position through pivoting the front of the edger about its rear wheels. By returning the control lever to the neutral position, the front wheel position setting member is returned to the locked condition by means of the return spring, thus, locking the front wheel in the desired position. For example, when the front wheel is lowered with respect to the edger frame, the cutter device is lifted relative to the front wheel and ground, thus decreasing the depth of the cutter.

When the edging operation is to be performed along a stepped surface such as a curb, the position of the adjustable rear wheel must be changed to meet the lower surface. The blade would operate along the upper surface as would the non-adjustable rear wheel and blade depth adjusting wheel. To adjust the position of the rear wheel, the operator would move the hand control lever to the other side, which would rotate the cam lever to disengage the rear wheel position setting member from the height set plate and allow the adjustable rear wheel to be moved to the desired position. Thereafter, by returning the control lever to the neutral position, the rear wheel position setting member is returned to the locked condition by means of the return spring, thus locking the adjustable rear wheel in the desired position.

DESCRIPTION OF THE PREFERRED EMBODIMENTS

Figure 14:
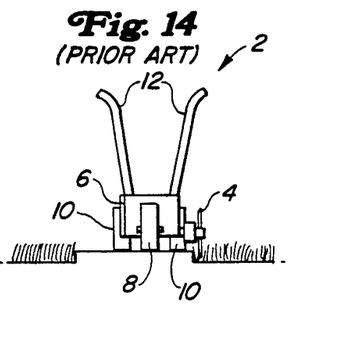
FIGS. 14 and 15 are front views showing working conditions of a conventional edger, respectively.

As mentioned earlier, the conventional edger 2 as illustrated in FIG. 14, includes a cutter device 4 arranged at the side of a traveling body or edger vehicle 6 having a front wheel 8 and rear wheels 10. It is controlled by an operator so that an edge of the grassland is trimmed by the edger by manipulating rear operating handles 12.

Figure 15:
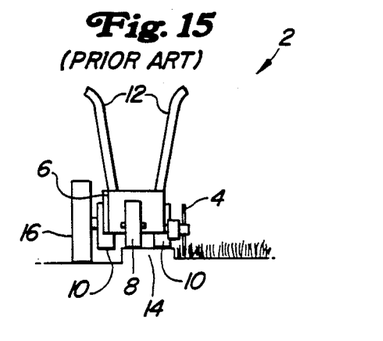
Figure 16:
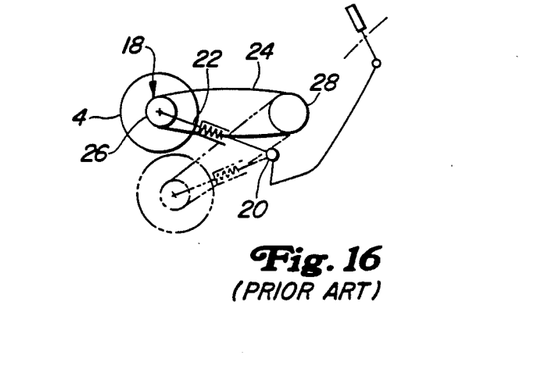
FIG. 16 is a schematic side view of a conventional cutter depth adjusting mechanism.

As shown in FIG. 15, an edger, when driven on a pavement with a curbstone 14 requires that the left rear wheel 10 and the front wheel 8 ride on the curbstone 14. In such a case, an attachment wheel 16 must be provided for the right rear wheel 10 to maintain the edger 2 in a horizontal condition. Accordingly, it can require a significant time to adapt the edger with an attachment wheel for riding on curbs.

Figure 1:
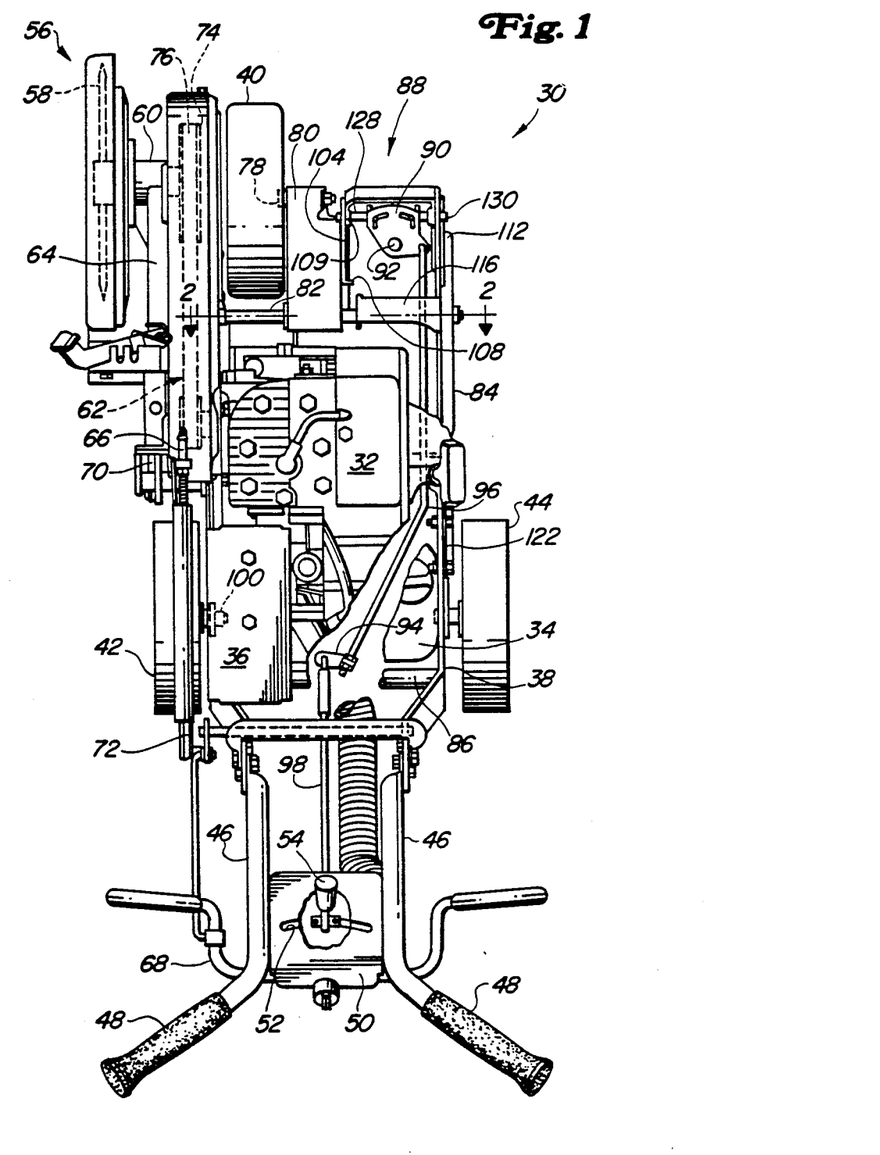
FIG. 1 is a plan view, in partial section, of an edger according to the present invention.

Looking now to the Figures which illustrate the present invention, and particularly FIG. 1, there is illustrated a plan view, in partial section, of an edger. The edger 30 includes an engine 32, a fuel tank 34, and a muffler 36 mounted on the edger frame 38. It also includes a single front or depth wheel 40, a non-adjustable left rear wheel 42 and a position adjustable right rear or curb wheel 44. A pair of left and right operating handles 46 are arranged at a rear end portion of the frame 38, the handles 46 extending upwardly and being provided at their ends with respective handle grips 48. A console box 50 is arranged between the handles 46. A transverse lever guide recess 52 is formed in a front surface of the console box 50, and a single control lever 54 protrudes upwardly from the guide recess 52.

A cutter device 56 is arranged on the front part of the frame 38 at the left side thereof, and a cutter shaft of a cutter blade 58 in the cutter device 56 is rotatably supported by a bearing housing portion 60. The cutter shaft is operatively connected to an output shaft of the engine 32 through a belt driving device 62. A head arm 64 is integrally formed on the bearing housing portion 60 and extends rearwardly therefrom, which head arm 64 is inserted in and supported by a tubular guide 66 for a longitudinal movement. The tubular guide 66 is fixed to the left side wall of the frame 38. The rear end of the head arm 64 is operatively connected to a clutch lever 68 arranged near the upper ends of the handles 46, through a push lever 70, two link rods 72 and the like. With this arrangement, by pulling the clutch lever 68 toward the handle grips 48, the head arm 64 and the bearing housing portion 60 are pushed forwardly through the link rods 72, thereby a front driven pulley 74 of the belt driving device 62 is shifted forwardly, engaging a belt 76. Further, the belt is tensioned by a tension spring (not shown) mounted on the link rods 72.

Further, when the operator removes his hands from the clutch lever 68, the bearing housing portion 60 is returned rearwardly by means of a return spring (not shown), disengaging the belt.

The front wheel 40 is rotatably mounted on a front wheel shaft 78 arranged on the front part of a front wheel supporting arm 80. The rear end of the supporting arm 80 is supported by an arm support shaft 82 fixed to the frame 38 for swinging movement in an up-and-down direction.

The front part of a rear wheel supporting arm 84 is supported by the right end of the arm support shaft 82 for swinging movement in an up-and-down direction, and the rear wheel supporting arm 84 extends rearwardly and is provided at its rear end with a right rear wheel shaft 86 on which the right rear wheel 44 is rotatably mounted.

There is provided on the front end portion of the frame 38, situated between the front wheel supporting arm 80 and the rear wheel supporting arm 84, a wheel height changing mechanism 88 for fixing and releasing the positions of the front wheel 40 and the position adjustable rear wheel 44. Within the changing mechanism 88, a single change lever 90 is mounted on a support shaft for swinging movement in the left and right direction. The right end of the change lever 90 is pivotally coupled with a relay lever 94 through a rearwardly extending relay rod 96. The relay lever 94 is fixed to a rotary shaft portion 98 of the control lever 54. The rotary shaft portion 98 is rotatably supported by the handles 46 or the frame 38 through an appropriate bracket and the like. That is to say, when the control lever 54 is turned to the right, the relay rod 96 is pulled rearwardly, thus, turning the change lever to the right, whereas, when the control lever 54 is turned to the left, the relay rod 96 is pushed forwardly, thus turning the change lever 90 to the left.

The non-adjustable left rear wheel 42 is rotatably mounted on a fixed shaft 100 formed on the frame 38.

Figure 2:
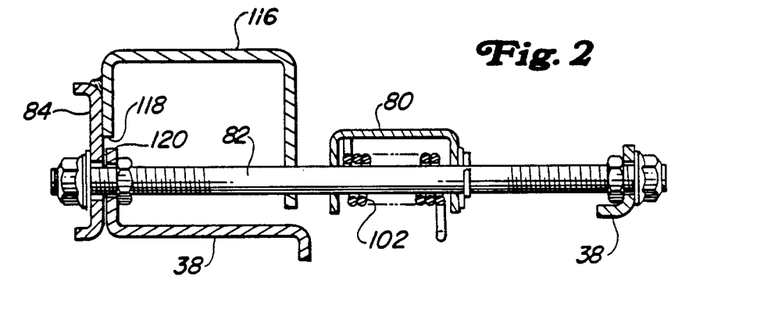
FIG. 2 is an enlarged sectional view taken along the line 2—2 of FIG. 1.

FIG. 2 shows a section taken along the line 2—2 of FIG. 1. In FIG. 2 a bias spring 102 engaged by the front wheel supporting arm 80 is mounted on the arm support shaft 82, which bias spring 102 acts on the front wheel supporting arm 80 to urge the front wheel downwardly.

Figure 6:
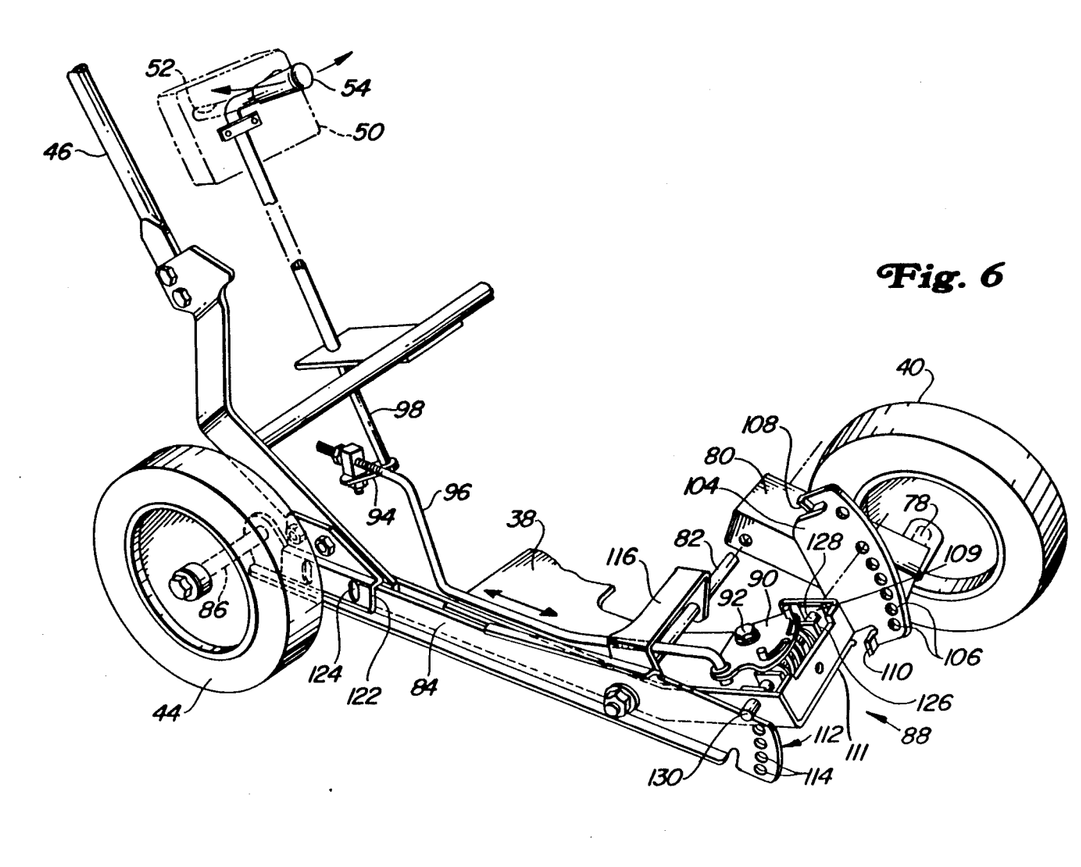
FIG. 6 is a perspective view showing a transmission mechanism, situated between a control lever and the front wheel, for changing the height of the front wheel.
Figure 7:
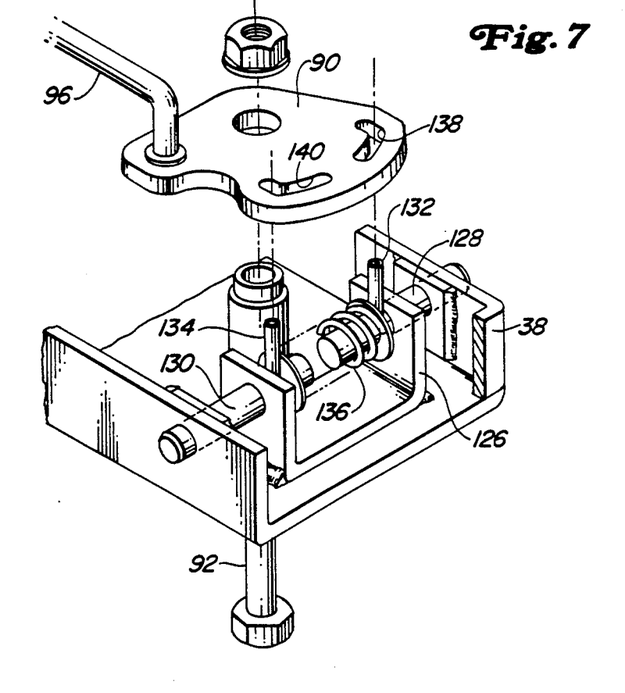
FIG. 7 is a perspective view showing a transmission mechanism situated between a control lever and the rear wheels, for changing the height of the rear wheel.

In FIG. 6 there is shown the mechanism for changing the height of the front wheel. It includes a vertical arcuate front wheel position set plate 104 fixed to the front and right part of the front wheel supporting arm 84. The set plate 104 has a plurality of position set openings 106 spaced apart from each other in an up-and-down direction which are preferably arranged in an arc having a center at the arm support shaft 82. Further, stops 108, 110 for regulating the extreme positions of the front wheel are formed on the upper and lower end of the set plate 104. When the front wheel is lowered to its extreme position, the stop 108 on the upper end of the set plate 104 abuts the upper surface 109 of the edger frame (see also FIG. 1. Similarly, when the wheel is raised to its extreme position, the stop 110 on the lower end of the set plate 104 abuts the lower surface 111 of the edger frame.

In FIG. 6 there is shown a mechanism for changing the position of the adjustable rear wheel. The mechanism includes a vertical arcuate rear wheel position set plate 112 which is integrally formed on the front part of the rear wheel supporting arm 84. The set plate 112 has a plurality of set openings 114 spaced apart from each other in an up-and-down direction and preferably arranged in an arc having a center at the arm support shaft 82.

An inverted U-shaped reinforcement arm 116 is welded to the arm support shaft 82 and to the supporting arm 84. The reinforcement arm 116 also serves as a stop for regulating the minimum position of the rear wheel. To this end, when the rear wheel 44 is lowered to its lowermost position, the lower surface (stop surface) 118 of the stop 116 is abutted against the upper end of the right frame 38 (see FIG. 2).

A guide arm 122 having an L-shaped cross-section is fixed to the right rear portion of the frame 38. The guide arm 122 is arranged to open downwardly and may contain elongated ribs 124 projecting leftwardly or inwardly towards the support arm. When the rear wheel is in the highest position, the rear portion of the rear wheel supporting arm 84 is received in the arm guide 122 and slidably contacts the inner faces of the ribs 124. Since the ribs project inwardly, they urge the supporting arm 84 towards the frame to hold it firmly in place.

Figure 4:
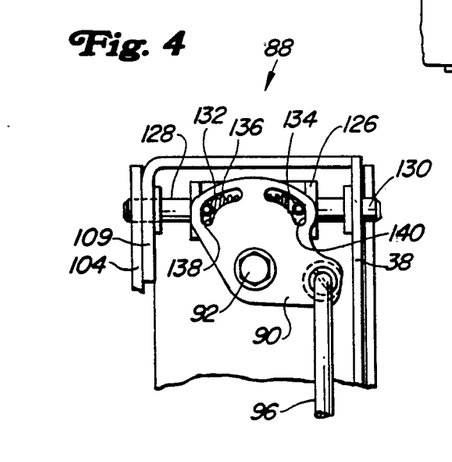
FIG. 4 is an enlarged plan view similar to FIG. 3, but with the cover omitted.

In FIG. 4 there is shown an enlarged plan view of the wheel height changing mechanism 88. A U-shaped bracket 126 is fixed to the front end portion of the frame 38. A set pin 128 for locking the position of the front wheel is supported between the left end wall of the bracket 126 and the left side wall of the frame for movement in the left and right direction, and a set pin 130 for locking the position of the adjustable rear wheel is positioned between the right end wall of the bracket 126 and the right side wall of the frame for movement in the left and right direction and is aligned with the set pin 128 The set pins 128, 130 have guide pins 132, 134 projecting upwardly therefrom, respectively, and a return spring 136 is compressed between these guide pins 132, 134 whereby the set pins 128, 130 are biased toward the respective wheel position locking conditions. That is to say, the return spring is so arranged that the left set pin 128 is biased leftwardly to engage with the set opening 106 of the front wheel set plate 104 whereas the right set pin 130 is biased rightwardly to engage with an upper edge or the set opening 114 of the rear wheel set plate 112.

The guide pins 132, 134 are received in elongated slots 138, 140 formed in the change lever, respectively. As mentioned above, the change lever 90 is rotatably mounted at its rear end on the shaft 92 and is pivotally connected at its right end to the front end portion of the relay rod 96. With this arrangement, when the change lever 90 is turned to the right, the left guide pin 132 is shifted to the right through the edge of the left elongated slot 138, whereby the left set pin 128 is separated from the front wheel set plate 104, thus releasing the locked condition. In this case, the right elongated slot 140 is merely shifted along the right guide pin 134, with the result that the right set pin 130 remains stationary. On the other hand, when the change lever 90 is turned to the left, the right guide pin 134 is shifted to the left through the edge of the right elongated slot 140, whereby the right set pin 130 is separated from the rear wheel set plate 112, thus releasing the locked condition.

Figure 3:
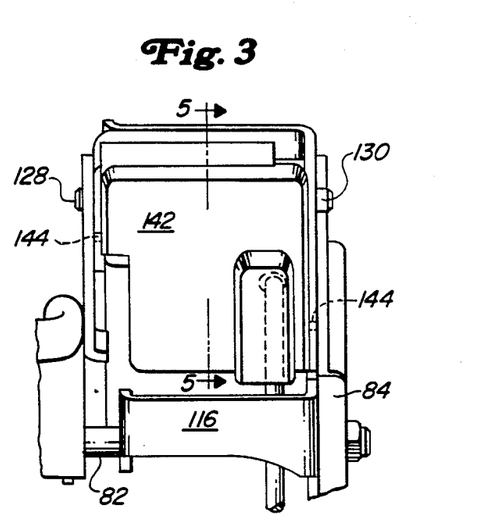
FIG. 3 is an enlarged plan view showing a portion of the height changing mechanism shown in FIG. 1, but with its cover attached.

Looking now to FIG. 3 there is shown the changing mechanism 88 covered by a dust cover 142. The dust cover 142 is made of elastic material and is provided at both its side walls with locking projections 144 formed integrally therewith and is provided at its front end with a positioning recess 146 for holding the cover, as is better illustrated in FIG. 5. Further, both the left and right walls of the dust cover are resilient and have spring-back characteristics. Still looking at FIG. 5, the positioning recess 146 is engaged by an upwardly extending lug formed on the front end of the frame 38. The left and right locking projections 144 (see FIG. 3) are engaged by holes (not shown) formed in the side walls of the frame 38.

Figure 5:
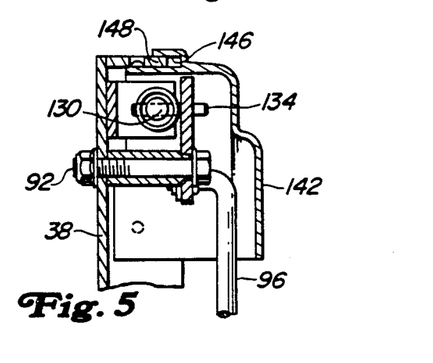
FIG. 5 is a sectional view taken along the line 5-5 of FIG. 3.

Therefore, when the dust cover 142 is being attached, the recess 146 is first engaged by the lug of the frame 38, and then, the dust cover 142 is inserted between the side walls of the frame 38 as the side walls of the dust cover are pressed inwardly. The projections 144 are inserted in the corresponding holes of the frame 38 with the aid of the spring-back function of the dust cover 142.

Next, the operation of the edger will be explained. Looking first to FIG. 6, and the mechanism for adjusting the depth of the cutter blade, it will be found that the cutter blade is adjusted by changing the position of the front wheel 40. To adjust the depth of the front wheel, the operator turns the control lever 54 to his right (counterclockwise as seen in FIG. 6). Consequently, the change lever 90 is turned to the right (clockwise as shown in FIG. 6) through the relay rods 96. Accordingly, the front wheel position setting pin 128 is shifted to the right as seen in FIG. 6 against the action of the return spring 136 to disengage from the position set plate 104. The front wheel 40 is now free to swing about its support shaft.

With the front wheel now released, the operator can select a new position for the front wheel by raising or lowering the front of the edger though swinging the edger around its rear wheels. With the front wheel in its new position, the operator can return the control lever 54 to its neutral position. As a result, the front wheel position set pin 128 is shifted back to the left by means of the return spring 136 to be inserted into the set opening 106 corresponding to the new position, thus locking the front wheel in the new position.

The operator can easily adjust the height of the front wheel since the bias spring 102 (FIG. 2) assists when the front wheel 40 is to be lowered. Conversely, the weight of the edger itself can be utilized if the front wheel is to be lifted to assist the operator in adjusting the height of the front wheel 40.

Figures 8, 10:
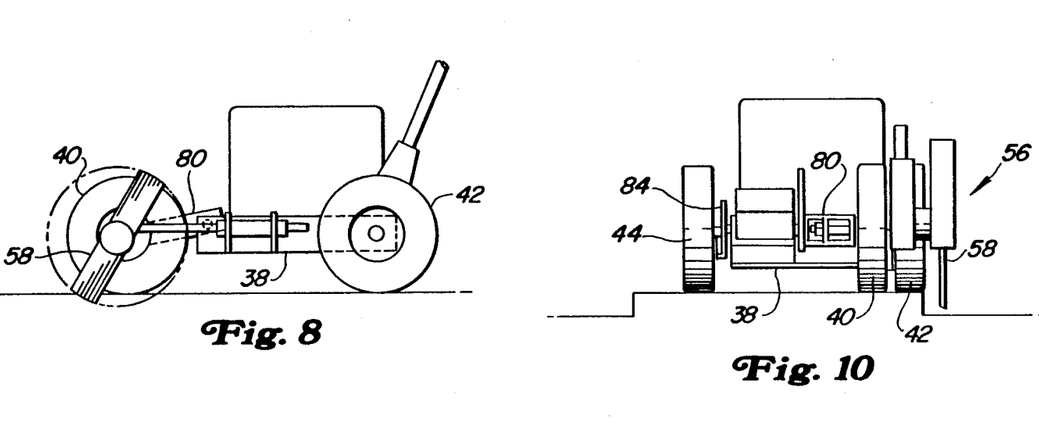
FIG. 8 is a schematic side view of the edger in a condition that the depth of the cutter is decreased.
FIG. 10 is a front view of the edger in a condition that the position of the right rear wheel is aligned with the position of the left rear wheel.

As shown in FIG. 8, when the front wheel 40 is lowered with respect to the frame 38, the cutter blade 58 is lifted relative to the wheel and ground, thus decreasing the depth of the cutter, i.e. reducing the amount of the grass and soil cut. On the other hand, as shown in FIG. 9, when the front wheel 40 is lifted with respect to the frame 38, the cutter blade 58 is lowered relative to the wheel and ground, thus increasing the depth of the cutter, i.e. increasing the amount of the grass and soil cut.

As shown in FIG. 10, when the grass is trimmed by the edger in a condition that the left and right rear wheels 42, 44 are on the same level, the rear wheel supporting arm 84 is positioned at its highest adjustment and engages the arm guide 122, as shown in FIG. 6. With the supporting arm in position, the rear wheel position setting pin 130 is abutted against the upper edge of the position set plate 112, thus preventing the rear wheel from lowering.

Figures 9, 11:
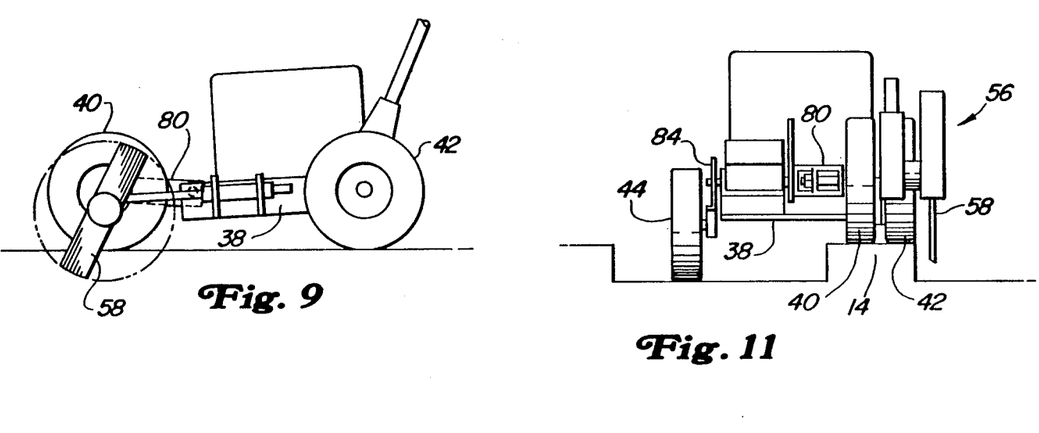
FIG. 9 is a schematic side view of the edger in a condition that the depth of the cutter is increased.
FIG. 11 is a front view of the edger in a condition that the position of the right rear wheel is lower than that of the left rear wheel.

Now looking to FIG. 11, the edger vehicle is illustrated in its condition when the front wheel 40 and the left rear wheel 42 are positioned on a curbstone 14 or stepped surface. To adjust the edger for this situation, the control lever 54, best shown in FIG. 6, is turned to the left. As a result, the change lever 90 is turned to the left through the relay rods 96, thus shifting the right rear wheel position setting pin 130 leftwardly against the action of the return spring 136 to disengage from the position set plate 112. Then, the rear wheel supporting arm 84 is lowered through the weight of the rear wheel 44 to a desired position to contact with the lower surface. Accordingly, the control lever 54 is returned to the neutral position, thus re-engaging the set pin 130 with the position set opening 114 corresponding to the desired wheel position.

The operator will perform the grass trimming operation while gripping the clutch lever 68 with either or both hands (FIG. 1). As the operator releases the clutch lever 68, the clutch is automatically disengaged.

Next, other embodiments will, be explained.

Figure 12:
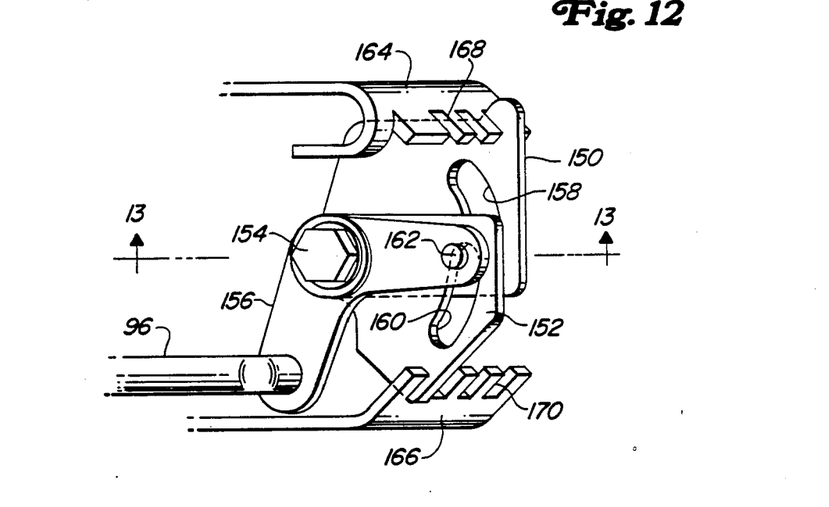
FIG. 12 is a partial plan view showing another example of a changing mechanism.
Figure 13:
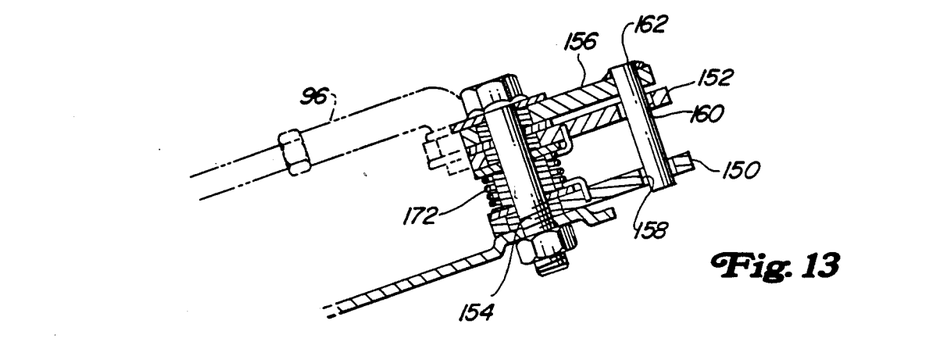
FIG. 13 is a sectional view taken along the line 13—13 of FIG. 12.

FIGS. 12 and 13 shows an example in which the wheel position setting members comprise left and right set levers 150 and 152, in place of the set pins.

In FIG. 12, rear ends of the set levers 150, 152 are rotatably mounted on a single shaft 154, and an intermediate portion of a bell-crank change lever 156 is also rotatably mounted on the shaft 154. The set levers 150, 152 are provided with elongated slots 158, 160, respectively, into which guide pins 162 formed on the change lever 156 are received. The right end portion of the change lever 156 is pivotally connected to the front end of the relay rod 96.

Furthermore, the front wheel position set plate 164 and the rear wheel position set plate 166 have a plurality of height set recesses or notches 168, 170, respectively, into which the set levers 150, 152 can be inserted.

In FIG. 13, a single return spring 172 is mounted around the shaft 154 and is compressed between the set levers 150 and 152. The return spring 172 biases the set levers toward their wheel fixing conditions. That is to say, the return spring biases the left set lever 150 to the left and the right set lever 152 to the right.

In the changing mechanism shown in FIG. 12, when the change lever 156 is turned to the right, clockwise as shown in FIG. 6, the left set lever 150 is turned to the right (clockwise) to disengage from the notch 168 of the set plate 164, thus permitting the adjustment of the position of the front wheel. On the other hand, when the change lever 156 is turned to the left, the right set lever 152 is disengaged from the notch 170 of the rear wheel set plate 166, thus permitting the adjustment of the position of the right rear wheel.

Whereas the right rear wheel was the height adjustable rear wheel in the embodiments described above, the left rear wheel is used as the height adjustable rear wheel on edgers having the cutter device at the right side. According to the present invention, the following technical advantages can be obtained:

(1) The operator can easily perform the adjustment of the depth of the cutter by changing the position of the front wheel and can adjust the position of one of the rear wheels when the edger should be driven on the curbstone, with a remote control at the operator station, without the necessity of discontinuing operation of the edger to make the adjustments.

(2) Since the clutch mechanism that shuts off the cutter blade when the operator releases the clutch lever is separate from the depth adjustment mechanism, the present edger provides the ability to adjust the cutter depth without stopping the edging operation.

(3) Since the front wheel position setting member and the adjustable rear wheel position setting members are arranged adjacent to each other on the frame and the single change lever is provided for releasing the set members by engaging with them, the changing mechanism for these members can be assembled in compact and inexpensive fashion.

(4) Since the set members are biased toward the respective wheel fixing conditions by means of the single return spring, the changing mechanism can be compact, and the set members can be automatically returned to their locked conditions after the adjustment of the wheel position.

(5) Since the control lever is arranged to release the front wheel adjustment when it is turned from neutral toward one direction, and to release the rear wheel when turned from neutral towards the other direction, the operator can more easily perform the controlling operation at his station. Further, since two kinds of control operations can be performed by the use of the single control lever, the mechanism is compact and inexpensive.

(6) Since the front wheel is supported by the supporting arm for upward and downward movement and is biased downwardly by means of the bias spring, the operator can adjust the position of the front wheel easily by turning the control lever from the neutral position toward the right due to the balance between the bias spring and the weight of the front wheel.

(7) Since the front part of the adjustable rear wheel supporting arm is supported by the frame for upward and downward movement, the operator can easily adjust the position of the rear wheel without interrupting the edging operation by either tilting the frame to the right or left through the operating handles while turning the control lever from the neutral position to the left, or pushing the left side of the edger onto the higher surface and then dropping the right curb wheel.

(8) Since the stops regulate the maximum and minimum positions of the front wheel by engaging the frame that can be formed on the front wheel set plate, and the number of parts can be reduced and the position of the front wheel can easily be adjusted.

(9) Since the inverted U-shaped reinforcement arm is fixed to the arm support shaft and the adjustable rear wheel supporting arm and the reinforcement arm are engageable with the frame and serve also as stops to regulate the minimum position of the adjustable rear wheel, the supporting strength of the adjustable rear wheel can be increased, the play of the supporting arm can be eliminated, and the number of parts reduced.

(10) Since the downwardly opened guide arm for receiving the rear end portion of the rear wheel supporting arm is arranged on the frame where the height adjustable rear wheel is arranged and the guide arm has ribs, the height of the height adjustable rear wheel when used on a level surface condition can be maintained in a stable condition without vibration. Further, by forming the ribs on the inner surface of the guide arm, the area of contact between the guide arm and the supporting arm is reduced, thus reducing the friction therebetween when the supporting arm is introduced into the guide arm.

(11) Since the dust cover for covering the changing mechanism is provided at both its side walls with locking projections and is provided at its front part with the cover positioning recess, and both of the side walls of the dust cover have spring-back features, the mounting and dismounting of the dust cover can be easily performed, and additional stops are not required, thus simplifying the structure.

We claim:

1. An edger wherein:
a front wheel is supported on the front part of an edger frame in such a manner that the height of said front wheel can be adjusted; a cutter device is arranged at one side of said edger frame; one of the rear wheels which is situated on the other side of said edger frame is supported by said edger frame in such a manner that the height of said rear wheel can be adjusted; a front wheel height fixing set member for fixing said front wheel at a desired height position and a rear wheel height fixing set member for fixing the height adjustable rear wheel at a desired position are arranged adjacent to each other on said edger frame; at least one change lever is provided for changing these set members to wheel height setting release conditions by engaging with these set members; a single control lever is rotatably arranged on handle portions positioned at a rear portion of said edger frame; and said control lever is operatively connected to said change lever through at least one relay rod.

2. An edge according to claim 1 wherein said front wheel height fixing set member and said height adjustable rear wheel height fixing set member include two left and right coaxial set pins each having a guide pin; a return spring is extended between said guide pins to bias said set pins toward respective wheel height fixing conditions and said change lever is engaged by both of said guide pins.

3. An edger according to claim 1 wherein said front wheel height fixing set member and said height adjustable rear wheel height fixing set member include two set levers rotatably mounted on a common shaft; a single return spring is provided for biasing both of said set levers toward respective wheel height fixing conditions and a single guide pin of said change lever is engaged by both of said set levers.

4. An edger according to claim 1 wherein said control lever is so arranged that, when it is shifted from its neural position toward one side, the front wheel height fixing condition obtained by said front wheel height fixing set member is released and when said control lever is shifted from said neutral position toward the other side, the rear wheel height fixing condition obtained by said height adjustable rear wheel height fixing set member is released.

5. An edger according to claim 1 wherein the height of said front wheel is adjustable by mounting a front wheel supporting arm on an arm support shaft of said edger frame for swinging movement in an up-and-down direction; a height set plate having a plurality of height set openings engageable with said front wheel height fixing set member is formed on said front wheel supporting arm and a bias spring is connected to said arm support shaft to bias said supporting arm downwardly.

6. An edger according to claim 5 wherein said height set plate includes stops engageable with said edger frame to regulate a maximum and minimum height position of said front wheel.

7. An edger according to claim 1 wherein said height adjustable rear wheel is supported by the rear end of a substantially longitudinally extending rear wheel supporting arm and the front end of said rear wheel supporting arm is rotatably mounted on an arm support shaft of said edger frame, whereby the height of said height adjustable rear wheel is adjustable and a height set plate having a plurality of height set openings engageable with said rear wheel height fixing set member is formed on a front part of said rear wheel supporting arm.

8. An edger according to claim 7 wherein an inverted U-shaped reinforcement arm is integrally formed on said arm support shaft of said height adjustable rear wheel supporting arm, whereby said reinforcement arm can also serve to regulate a minimum height position of said height adjustable rear wheel by abutting said reinforcement arm against said edger frame.

9. An edger according to claim 7 wherein a downwardly opened arm guide for receiving the rear end portion of said rear wheel supporting arm is provided on the side of said edger frame where said height adjustable rear wheel is arranged and ribs are formed on said arm guide.

10. An edger according to claim 1 wherein a dust cover of elastic material is provided for covering the front wheel height fixing set member, the height adjustable rear wheel height fixing set member and the single change lever for releasing the fixing conditions of said set members and said dust cover is provided at both its side walls with positioning projections and is provided at its front part with a cover holding recess, and both of said side walls of said dust cover have spring-back features.

11. In a lawn edger having a frame with front and side portions;
a powered cutting blade supported on one side of the frame for movement therewith;
axle means extending transversely on the frame;
a first frame supporting wheel carried on the axle means and positioned near the cutting blade;
second frame supporting wheel carried on the axle means and positioned on the side of the frame opposite the cutting blade;
a third frame supporting wheel carried on the same side of the frame as the blade;
first and second means for adjusting respectively the position of the first and second wheels relative to the frame; and
control means for alternately operating either the first or second adjusting means.

12. The invention described in claim 11 wherein the first and second wheel are carried on first and second arms which are swingably mounted on the axle means; and
the first and second means for adjusting the position of the first and second wheels includes a plurality of settings for fixing the position of the arms relative to the axle means.

13. The invention as described in claim 12 wherein the plurality of settings include a series of openings in each arm into which a position fixing means may be inserted.

14. The invention as described in claim 13 wherein the control means is operatively connected with the position fixing means to permit alternate selective insertion or removal of the position fixing means into the openings of either arm.

15. The invention described in claim 13 wherein the position fixing means includes first and second coaxial pins selectively insertable into the openings of the first and second arms respectively.

16. The invention as described in claim 15 wherein biasing means urges the pins towards a position of insertion into the openings and the control means is operatively connected to the biasing means to selectively allow it to urge either pin into an opening in an arm.

17. The invention as described in claim 16 wherein the control mans includes a lever moveable in a first direction to remove the first pin from an opening of the first arm or moveable in a second direction to remove the second pin from an opening of the second arm.

18. The invention as described in claim 12 wherein there is further provided means between the frame and first arm for biasing the arm in a downwardly direction.

19. The invention as described in claim 12 wherein stops are provided between the frame and second arm to limit swinging movement of the second arm relative to the frame.

20. The invention as described in claim 12 wherein the mid portion of the second arm is carried on the axle means with the second wheel being carried on the rear end portion of the arm and a plurality of horizontally extending openings are formed on the forward end portion of the second arm.

21. In a lawn edger having
a frame with front and side portions and an operator handle extending upwardly therefrom;
a powered blade drive belt;

a cutting blade operatively coupled with the belt and supported on one side of the frame for movement therewith;

axle means extending transversely on the frame;

a blade depth control wheel carried on the axle means and positioned near the cutting blade;

means for adjusting the position of the depth control wheel;

means for drivingly engaging the blade with the drive belt;

first control means carried on the operator handle and operatively connected with the means for adjusting the position of the depth control wheel; and second control means carried on the operator handle and operatively connected with the means for drivingly engaging the cutting blade belt, said second control means including lever means adapted to require the presence of an operator's hand contact to permit the cutting blade drive belt to be drivingly engaged.

* * * * *

UNITED STATES PATENT AND TRADEMARK OFFICE
CERTIFICATE OF CORRECTION

PATENT NO. : 4,962,631

DATED : 16 October 1990

INVENTOR(S) : Stephen A. Braun et al

It is certified that error appears in the above-identified patent and that said Letters Patent is hereby corrected as shown below:

Column 10, line 67, delete "edge" and insert --edger--.

Column 11, line 17, delete "neural" and insert --neutral--.

Column 12, line 47, delete "mans" and insert --means--.

Signed and Sealed this

Ninth Day of June, 1992

Attest:

DOUGLAS B. COMER

*Attesting Officer*     *Acting Commissioner of Patents and Trademarks*

UNITED STATES PATENT AND TRADEMARK OFFICE
CERTIFICATE OF CORRECTION

PATENT NO. : 4,962,631

DATED : 16 October 1990

INVENTOR(S) : Stephen A. Braun et al.

It is certified that error appears in the above-identified patent and that said Letters Patent is hereby corrected as shown below:

On the title page: Item [73]:
Add Kawasaki Jukogyo Kabushiki Kaisha, Kobe, Japan, as co-assignee with Deere & Company, Moline, Illinois Signed and Sealed this Twenty-third Day of November, 1993

Attest:

BRUCE LEHMAN

*Attesting Officer*  *Commissioner of Patents and Trademarks*